US008773773B2

(12) United States Patent
Kim

(10) Patent No.: US 8,773,773 B2
(45) Date of Patent: Jul. 8, 2014

(54) IMAGING LENS

(75) Inventor: Seonyoung Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 403 days.

(21) Appl. No.: 12/956,612

(22) Filed: Nov. 30, 2010

(65) Prior Publication Data
US 2011/0134544 A1   Jun. 9, 2011

(30) Foreign Application Priority Data

Nov. 30, 2009   (KR) .................. 10-2009-0117166

(51) Int. Cl.
*G02B 13/18*   (2006.01)
*G02B 9/14*   (2006.01)

(52) U.S. Cl.
USPC .......................................... 359/716; 359/785

(58) Field of Classification Search
USPC ................... 359/716, 713–715, 785
See application file for complete search history.

(56) References Cited

U.S. PATENT DOCUMENTS

| 7,660,050 | B2 * | 2/2010 | Sato et al. ..................... 359/785 |
| 7,813,057 | B2 * | 10/2010 | Lin ............................... 359/775 |
| 7,894,142 | B1 * | 2/2011 | Tang et al. .................... 359/792 |
| RE42,642 | E * | 8/2011 | Sato et al. ..................... 359/753 |
| 8,094,383 | B2 * | 1/2012 | Chu .............................. 359/716 |
| 2008/0165435 | A1 * | 7/2008 | Huang et al. ................. 359/716 |
| 2008/0225411 | A1 * | 9/2008 | Kim et al. ..................... 359/785 |
| 2011/0090392 | A1 * | 4/2011 | Tang et al. .................... 348/345 |

FOREIGN PATENT DOCUMENTS

JP         2009-222950 A       10/2009

OTHER PUBLICATIONS

Office Action dated Jun. 21, 2011 in Korean Application No. 10-2009-0117166, filed Nov. 30, 2009.

* cited by examiner

*Primary Examiner* — Jordan Schwartz
(74) *Attorney, Agent, or Firm* — Saliwanchik, Lloyd & Eisenschenk

(57) ABSTRACT

Provided is an imaging lens, including, in an ordered way from an object side, a first lens having positive (+) refractive power, a second lens having negative (−) refractive power and having a meniscus shape concavely formed at an object side surface, and a third lens having positive (+) refractive power and having an aspheric shape. An object side surface and an image side surface of the third lens can each have an inflection point.

7 Claims, 4 Drawing Sheets

IMAGING LENS

CROSS-REFERENCE TO RELATED APPLICATION

This application claims the benefit under 35 U.S.C. §119 of Korean Patent Application No. 10-2009-0117166, filed Nov. 30, 2009, which is hereby incorporated by reference in its entirety.

BACKGROUND OF THE DISCLOSURE

1. Field of the Invention

The present invention relates to an image lens, and in particular, to an image lens for a subminiature imaging lens mounted on a camera module.

2. Discussion of the Related Art

Recently, vigorous research efforts are being made in the field of a mobile phone-purpose camera module, a digital still camera (DSC), a camcorder, and a PC camera (an imaging device attached to a person computer) all connected with an image pick-up system. One of the most important components in order that a camera module related to such an image pickup system obtains an image is an imaging lens producing an image.

An imaging lens designs a number of a lens, a form of a lens, a focal distance, a refractive index, and an Abbe value variously, realizing a desired view angle and resolution. That is, an imaging tem may be variously practiced according to an applied object.

BRIEF SUMMARY

An image lens stables lens performance to a high degree and provides a microminiaturized imaging lens having an improved aberration characteristic.

An image lens according to one embodiment of the present invention includes a first lens having a positive (+) refractive power, a second lens having a negative (−) refractive power and being a meniscus shape concavely formed at an object side surface, and a third lens having a positive (+) refractive power and being an aspheric shape in which an object side surface and an image side surface both have inflection points, wherein an aperture is placed between the first lens and the second lens.

A subminiature lens module may be provided by disposing lens power of three pieces as PNP (+−+), an imaging lens superior in distortion correction and capable of maintaining lens performance stably is provided by disposing an aperture at the front side of a second lens. An imaging lens according to the present embodiment is quite superb in aberration characteristic and manifests itself favorable aberration correcting capacity.

DETAILED DESCRIPTION

Figure 1:
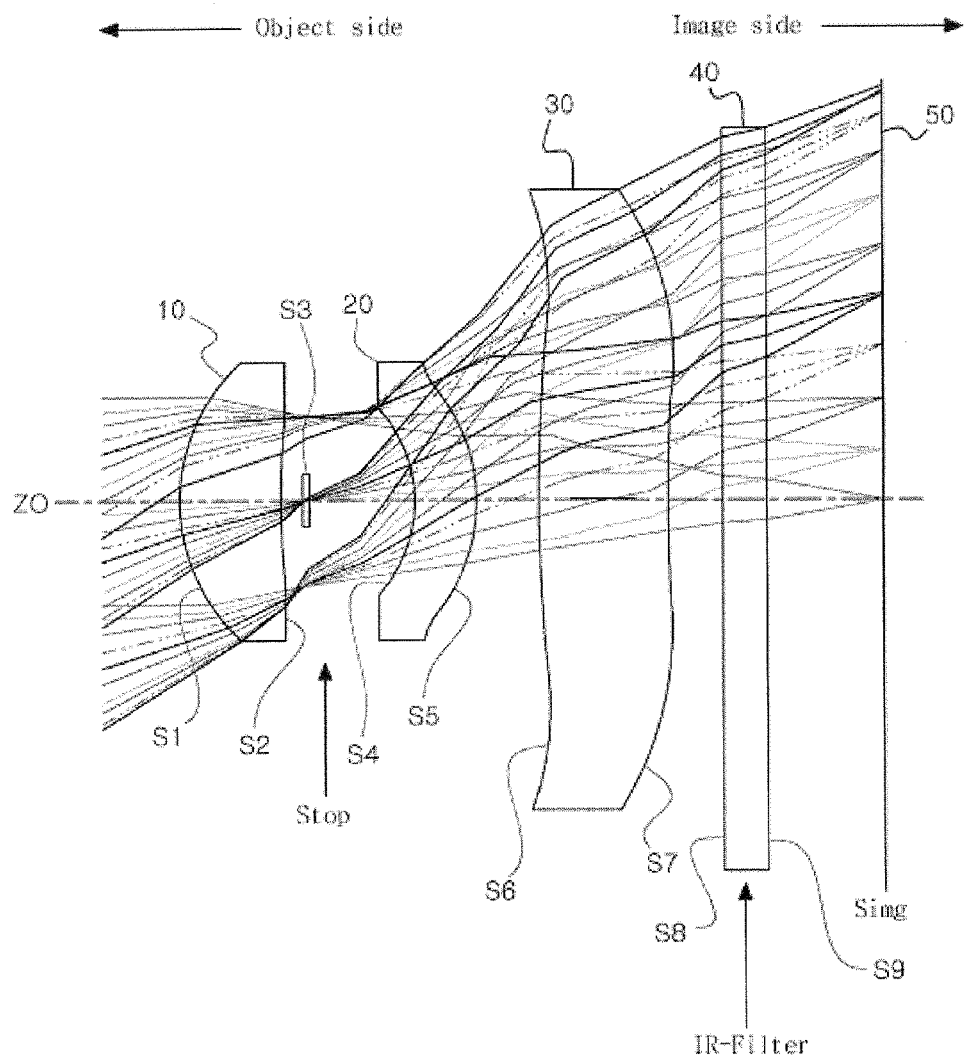
FIG. 1 is a construction diagram of an imaging lens according to the present embodiment.

Since the present invention can be applied with various changes thereto and have several types of embodiments, specific embodiments intend to be exemplified in the drawings and minutely described in the detailed description. However, it does not limit the present invention to a specific example but should be appreciated to include all the changes, equivalents and replacements which fall in the spirit and technical scope of the present invention.

Stated that any component is "connected" or "conjunctive" to another component, it will be appreciated to be directly connected or conjunctive to the very another component or otherwise that there exists any component in the midst of them.

In the following, the present invention will be described in detail referring to the attached drawings, but without regard to a drawing sign, an identical or corresponding component is assigned the same reference numeral and a redundant description regarding this will be omitted.

As a construction diagram of a camera lens module according to the present embodiment, FIG. 1 is a lateral surface construction diagram exemplifying a layout state of a lens around an optical axis ZO. In the construction of FIG. 1, a thickness, size, and shape of a lens are rather overdrawn for description, and a spheric or aspheric shape has been only presented as one embodiment, but obviously not limited to this shape.

Referring to FIG. 1, a camera lens module of the present invention has a layout construction with a first lens 10, a second lens 20, a third lens 30, a filter 40, and a light receiving element 50 in order from an object side.

Light corresponding to image information of a subject passes through the first lens 10, the second lens 20, the third lens 30, and the filter 40 to be incident on the light receiving element 50.

Hereinafter, in description of a construction of each lens, "object side surface" means a surface of a lens facing an object side to an optical axis, and "image side surface" means a surface of a lens facing an image surface to an optical axis.

A first lens 10 has a positive (+) refractive power, and an object side surface S1 is concavely formed. A second lens 20 has a negative (−) refractive power, and is a lens of meniscus shape in which an object side surface S4 is concave. And, an aperture (STOP) is placed between a first lens 10 and a second lens 20. A third lens 30 has a positive (+) refractive power, and is a lens of an aspheric shape in which an object side surface S6 is convex.

Herein, both surfaces of a third lens 30 are all aspheric shapes having an inflection point. As shown in the figure, an image side surface S7 of a third lens 30 is bent to an imaging side as heading from a central part which is centered on an optical axis ZO to a surrounding, and again forms an aspheric inflection point by bending toward an object side as heading a surrounding part which is far away from an optical axis ZO to an outermost part area.

An aspheric inflection point formed at a third lens 30 may adjust a maximum emergence angle of a primary ray incident on a light receiving element 50. And, an aspheric inflection point formed at an object side surface S6 and an object side surface S7 of a third lens 30 adjusts a maximum emergence angle of a primary ray, and inhibits a shading of a surrounding part of a screen.

The filter 40 is at least any one of optical filters such as an infrared filter and a cover glass. A filter 40, in a case an infrared filter is applied, blocks such that radiating heat emitting from external light does not transfer to the light receiving element 50. Also, an infrared filter penetrates visible light and reflects infrared for outflow to an external part.

The light receiving element 50 is an imaging sensor such as CCD (Charge Coupled Device) or CMOS (Complementary Metal Oxide Semiconductor).

The first lens 10, the second lens 20, the third lens 30 use an aspheric lens like a later-described embodiment, thereby improving resolution of a lens and taking an advantage of superior aberration characteristic.

A later-described conditions and embodiment is a preferred embodiment raising an action and effect, and it would be understood by a person in the art that the present invention should be constructed of the following conditions. For example, a lens construction of the invention will have a raised action and effect only by satisfying part of conditions among lower-part described condition equations.

$$0.1 < f1/f < 0.8 \quad \text{[Condition 1]}$$

$$-2 < d/f < -1 \quad \text{[Condition 2]}$$

$$2 < f3/f < 3 \quad \text{[Condition 3]}$$

$$0.5 < T/f < 1.5 \quad \text{[Condition 4]}$$

$$0.1 < d2/d3 < 5 \quad \text{[Condition 5]}$$

$$0.2 < bf/f < 0.5 \quad \text{[Condition 6]}$$

where, f: overall focal length of imaging lens
f1: focal length of first lens
f2: focal length of second lens
f3: focal length of third lens
T: distance from object side surface of first lens to image-forming surface
d2: distance from object side surface of first lens to the aperture
d3: distance from aperture to object side surface of the second lens
bf: distance from object side surface of third lens to image-forming surface Conditions 1, 2 and 3 specify refractive power of a first lens 10, refractive power of a second lens 20, and refractive power of a third lens 30. The first lens 10, a second lens 20, and a third lens 30 have refractive powers having proper spherical aberration and proper chromatic aberration corrected by Condition 1, 2 and 3. Condition 4 specifies a dimension of an optical axis direction of an overall optical system, that is, a miniaturized lens related condition and a proper aberration correction related condition.

Condition 5 specifies the position S3 of an aperture. Referring to Condition 5, an aperture is basically positioned more than two times nearer to an object side surface S4 of a second lens 20 compared to an imaging side surface S2 of a first lens 10. In an extent of satisfying Conditions 5 and 6, as the position S3 of an aperture (STOP) is close by to a second lens 20, or an aperture (STOP) closes to an central part of an optical system, lens performance is more stably realized.

Hereinafter, an action and effect of the present invention will be presented with reference to a specific embodiment. An aspheric shape mentioned in the following embodiment is obtained from a known Equation 1, and k is Conic constant.

$$z = \frac{cY^2}{1 + \sqrt{1 - (1+K)c^2 Y^2}} + AY^4 + BY^4 + CY^4 + DY^4 + EY^4 + FY^4 + \ldots \quad \text{Equation 1}$$

where, z: distance in optical axis direction from top point of lens
c: basic curvature of lens
Y: distance in perpendicular direction to optical axis
K: Conic constant
A, B, C, D, E, F: aspheric coefficient Embodiment

TABLE 1

| | Embodiment |
|---|---|
| f | 2.78 |
| f1 | 2.199941 |
| f2 | −4.887414 |
| f3 | 7.976127 |
| f1/f | 0.791 |
| f2/f | −1.758 |
| f3/f | 2.8691 |
| T | 3.42 |
| T/f | 1.23 |
| d2 | 0.055 |
| d3 | 0.38 |
| d2/d3 | 0.145 |
| Bf | 0.79 |
| Bf/f | 0.284 |

The following Table 1 shows an embodiment complying with the above-described Condition.

Referring to Table 1, f1/f is 0.791, so that it can be known to match with Condition 1, f2/f is −1.758, and thus matching to Condition 2 can be known, f3/f is 2.8691, thus it can be known of match with Condition 3, and since T/f is 1.23, it can be appreciated matching with Condition 4, and d2/d3 is 0.145, so that a match with Condition 5 can be known, and Bf/f is 0.284, thus it can be known of match with Condition 6. Especially, it can be known from the above embodiment that a position S3 of an aperture (STOP) greatly approaches an object side as well as placed near to a central part in an entire optical system. This means that an imaging lens of the present embodiment is quite stable in lens performance.

TABLE 2

| Surface number | Curvature Radius (R) | Thickness or Distance (d) | Refractive index (N) |
|---|---|---|---|
| 1* | 0.97013 | 0.534397 | 1.53 |
| 2* | 4.57645 | 0.055 | |
| 3 stop | | 0.38 | |
| 4* | −0.60319 | 0.333775 | 1.61 |
| 5* | −0.91267 | 0.199028 | |
| 6* | 2.06662 | 0.739131 | 1.53 |
| 7* | 3.52689 | 0.121822 | |
| 10 | | 0.264545 | 1.52 |
| 11 | 0 | 0.795379 | |
| image | | −0.00176 | |

In the above Table 2, notation * stated next to surface numbers indicates an aspheric surface.

An embodiment of Table 2 shows a more specific embodiment over an embodiment of Table 1.

And, the following Table 3 indicates a value of an aspheric coefficient of each lens in an embodiment of the Table 2.

TABLE 3

| Surface Number | K | A | B | C | D | E | F |
|---|---|---|---|---|---|---|---|
| 1* | 0.31556 | −0.0526 | 0.00939 | −0.5601 | 0.35259 | −0.9813 | −2.6721 |
| 2* | −6.7236 | −0.0931 | −0.6286 | −0.4624 | −3.682 | 17.0339 | 0 |
| 4* | 0.4478 | 0.5195 | 0.112 | 10.2506 | 13.7292 | 45.2172 | 45.8928 |
| 5* | −0.3551 | −0.206 | 0.97695 | −0.22 | 3.36672 | −1.2727 | −6.6694 |
| 6* | −32.656 | −0.1745 | 0.1787 | −0.0673 | −0.0036 | 0.00703 | −0.0012 |
| 7* | −25.327 | −0.1741 | 0.07123 | −0.0327 | 0.0034 | 0.00471 | −0.0018 |

Figure 2:
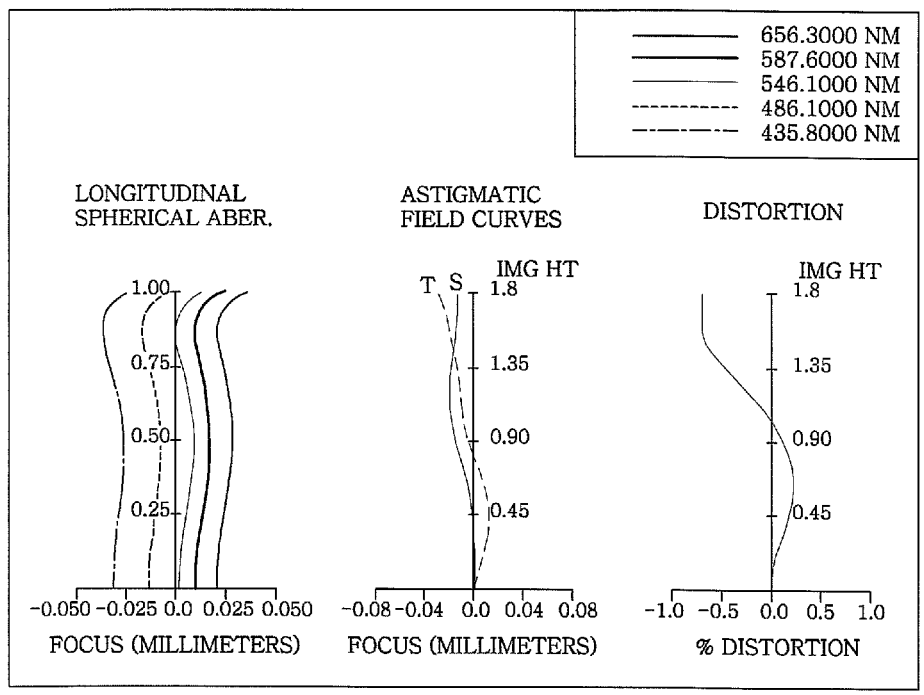
FIG. 2 is a graph showing aberration characteristic according to one embodiment of the present invention.

As a graph showing an aberration diagram according to the above embodiment, FIG. 2 is a graph measuring longitudinal spherical aberration, astigmatic field curves, and distortion in order from the left.

In FIG. 2, a Y axis means size of an image, and an X axis means focal length (unit mm) and distortion degree (unit: %). In FIG. 2, it is interpreted that an aberration correction function is good as curves approach to the Y axis. In a shown aberration diagram, because a value of images in nearly all fields appears proximate to the Y axis, and longitudinal spherical aberration, astigmatic field curves, and distortion all show a superior figure.

Figure 3A:
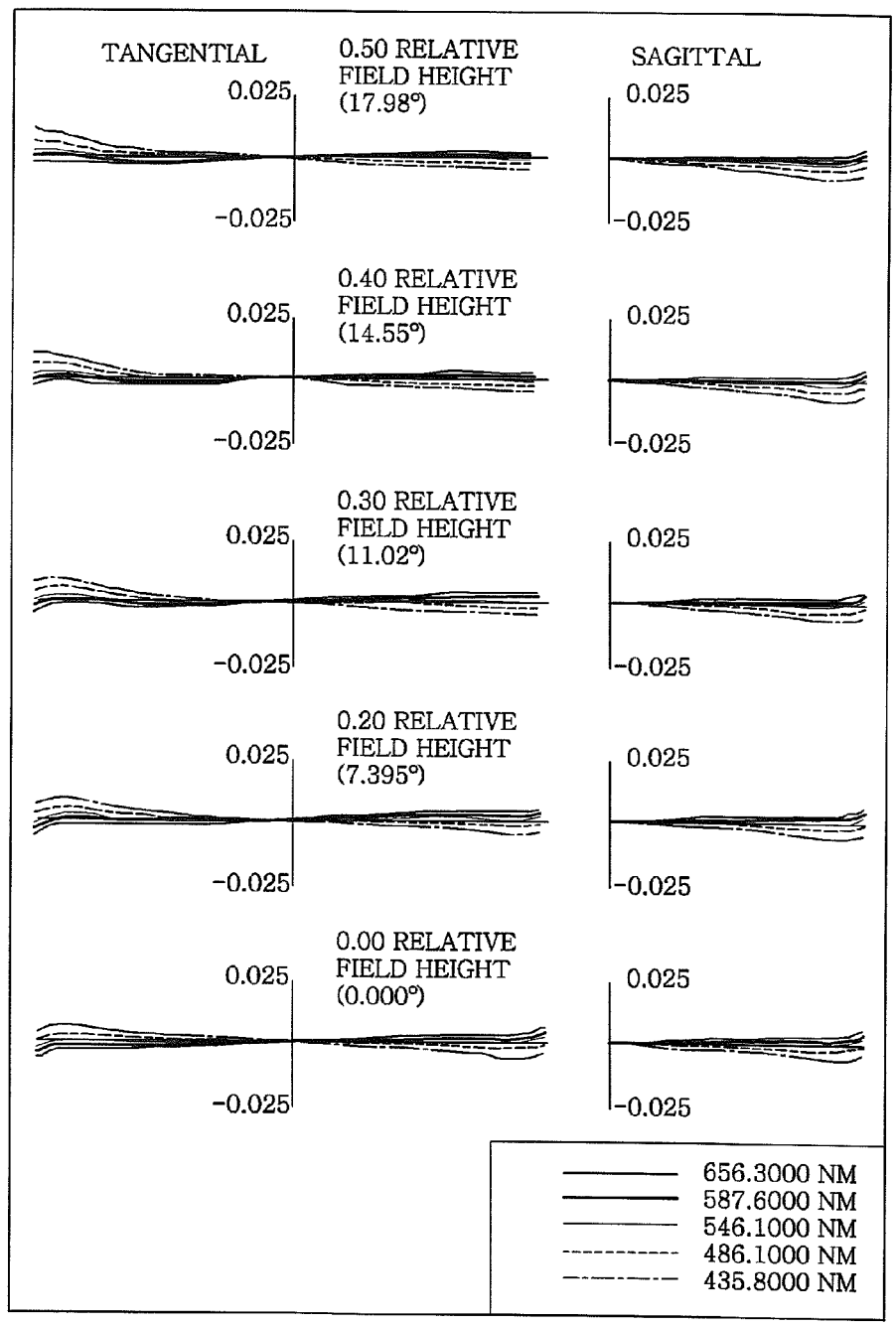
FIGS. 3A and 3B are graphs showing coma-aberration according to one embodiment of the present invention.
Figure 3B:
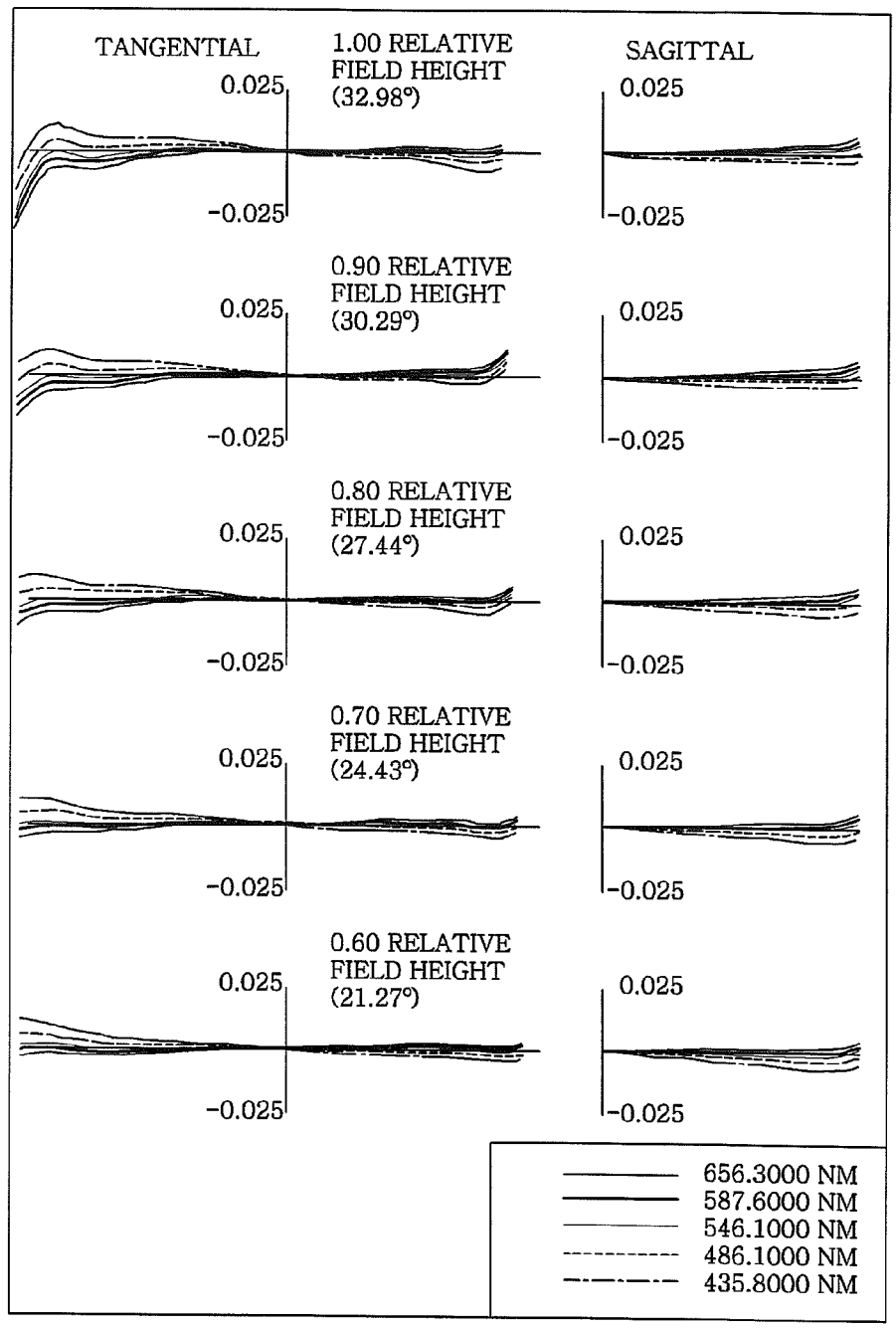

As a graph measuring coma aberration, FIGS. 3a and 3b are graphs measuring tangential aberration and sagittal aberration of each wavelength based on a field height. In FIGS. 3a and 3b, as a graph showing a test result approaches to an X axis at a positive axis and a negative axis, respectively, it is explained that a coma aberration correction function is good. In measurement examples of FIG. 3, a value of images in nearly all fields appear proximate to an X axis, it is explained that all of them show a superior coma-aberration correction function.

While the present invention has been described with reference to embodiments in the above part, it would be understood by those skilled in the art that various changes and modifications can be made without departing from the spirit or scope of the present invention. Therefore, not confined to the above-described embodiment, the invention would be asserted to include all embodiments within the scope of the accompanying claims.

What is claimed is:

1. An imaging lens, comprising in an ordered way from an object side:
    a first lens having a positive (+) refractive power and being a meniscus shape convexly formed at an object side surface, wherein both surfaces of the first lens are aspheric surfaces;
    a second lens having a negative (−) refractive power and being a meniscus shape concavely formed at an object side surface, wherein both surfaces of the second lens are aspheric surfaces; and
    a third lens having a positive (+) refractive power and being an aspheric shape in which an object side surface and an image side surface both have inflection points, wherein the third lens has a meniscus shape convexly formed at an object side surface at an optical axis of the imaging lens,
    wherein an aperture is placed between the first lens and the second lens,
    wherein an image side surface of the third lens is bent to an imaging side as heading from a central part which is centered on the optical axis to a surrounding part that is farther away from the optical axis than the central part is, and forms an aspheric inflection point by bending toward an object side as heading from the surrounding part to an outermost part that is farther away from the optical axis than the surrounding part is, and
    wherein the imaging lens satisfies a condition of $2<f3/f<3$, when an entire focal length of the imaging lens is f and a focal length of the third lens is f3.

2. The imaging lens of claim 1, wherein the imaging lens satisfies conditions of $0.1<f1/f<0.8$ and $-2<f2/f<-1$, when an entire focal length of the imaging lens is f, a focal length of the first lens is f1, and a focal length of the second lens is f2.

3. The imaging lens of claim 1, wherein the imaging lens satisfies a condition of $0.5<T/f<1.5$, when an entire focal length of the imaging lens is f, and a distance from an object side surface of the first lens to an image-forming surface is T.

4. The imaging lens of claim 1, wherein the imaging lens satisfies a condition of $0.2<bf/f<0.5$, when a distance from an object side surface of the third lens to an image-forming surface is bf, and an entire focal length of the imaging lens is f.

5. The imaging lens of claim 1, wherein the imaging lens satisfies a condition of $N2=1.61$, wherein N2 is a refractive index of the second lens.

6. The imaging lens of claim 1, wherein the imaging lens satisfies a condition of $N1=N3$, wherein N1 is a refractive index of the first lens and N3 is a refractive index of the third lens.

7. The imaging lens of claim 1, wherein a maximum exit angle of a principal ray is determined by the aspheric inflection point formed at the third lens.

* * * * *